United States Patent
Bressan et al.

(10) Patent No.: US 10,620,099 B2
(45) Date of Patent: Apr. 14, 2020

(54) SOLID PROJECTILE WITHOUT STABILIZING STRUCTURE FOR BIRD STRIKE TESTS CONSISTING OF A GEL COMPRISING GLYCEROL

(71) Applicant: ETAT FRANCAIS REPRESENTE PAR LE DELEGUE GENERAL POUR L'ARMEMENT, Paris (FR)

(72) Inventors: Christian Bressan, Balma (FR); Henri Etcheto, Toulouse (FR); David Denaux, Labege (FR); Georges Vidal, Plaisance du Touch (FR); Gerard Diulius, Saint-Jean (FR); Patrick Sarrazac, Toulouse (FR); Christian Jean Marie, Labastidette (FR)

(73) Assignee: ÉTAT FRANÇAIS représenté par LE DÉLÉGUÉ GÉNÉRAL POUR L'ARMEMENT, Paris (FR)

( * ) Notice: Subject to any disclaimer, the term of this patent is extended or adjusted under 35 U.S.C. 154(b) by 164 days.

(21) Appl. No.: 15/524,911

(22) PCT Filed: Nov. 6, 2015

(86) PCT No.: PCT/FR2015/000204
§ 371 (c)(1),
(2) Date: May 5, 2017

(87) PCT Pub. No.: WO2016/071587
PCT Pub. Date: May 12, 2016

(65) Prior Publication Data
US 2017/0350799 A1    Dec. 7, 2017

(30) Foreign Application Priority Data
Nov. 6, 2014  (FR) .................................. 14 02511

(51) Int. Cl.
    *G01N 3/30*  (2006.01)
    *F42B 8/14*  (2006.01)
    (Continued)

(52) U.S. Cl.
    CPC ............... *G01N 3/30* (2013.01); *F42B 5/025* (2013.01); *F42B 8/14* (2013.01); *F42B 12/34* (2013.01);
    (Continued)

(58) Field of Classification Search
    None
    See application file for complete search history.

(56) References Cited

U.S. PATENT DOCUMENTS 5,450,795 A * 9/1995 Adelman ................ F42B 12/50
                                            102/444
7,063,021 B2 * 6/2006 Keegstra ................ F42B 12/34
                                            102/438
(Continued)

FOREIGN PATENT DOCUMENTS

EP      2 172 734 A1    4/2010
WO      2013/109634 A1  7/2013

OTHER PUBLICATIONS

International Search Report, dated Jan. 28, 2016, from corresponding PCT application.
(Continued)

Primary Examiner — Natalie Huls
Assistant Examiner — Jermaine L Jenkins
(74) Attorney, Agent, or Firm — Young & Thompson

(57) ABSTRACT

Disclosed are a projectile and a method of its manufacture for the field of investigating the strength properties of a solid material by application of a mechanical force and more particularly for bird strike tests consisting of a gel including glycerol. A projectile 1 according to the invention may have (Continued)

a central portion 4 of cylindrical shape including a substantially hemispherical portion 2, 3 at each of the ends thereof.

18 Claims, 3 Drawing Sheets

(51) Int. Cl.
*G01M 7/08* (2006.01)
*F42B 12/36* (2006.01)
*F42B 5/02* (2006.01)
*F42B 12/74* (2006.01)
*F42B 12/34* (2006.01)
*B64F 5/60* (2017.01)
*G01N 3/62* (2006.01)

(52) U.S. Cl.
CPC ............ *F42B 12/36* (2013.01); *F42B 12/745* (2013.01); *G01M 7/08* (2013.01); *B64F 5/60* (2017.01); *G01N 3/62* (2013.01)

(56) References Cited

U.S. PATENT DOCUMENTS

| | | | |
|---|---|---|---|
| 7,861,657 B2 * | 1/2011 | Danon | F42B 12/34 102/502 |
| 7,883,774 B1 | 2/2011 | Baggs | |
| 8,047,136 B2 * | 11/2011 | MacDougall | F42B 12/02 102/293 |
| 8,220,396 B2 | 7/2012 | Ritt | |
| 8,671,841 B2 * | 3/2014 | Raquin | F42B 12/745 102/335 |
| 9,021,959 B2 * | 5/2015 | Hayes | F42B 10/00 102/439 |
| 9,470,492 B2 * | 10/2016 | Carlson | F42B 8/16 |
| 2009/0320710 A1 | 12/2009 | Macdougall et al. | |
| 2010/0077832 A1 | 4/2010 | Turner et al. | |
| 2016/0153759 A1 * | 6/2016 | Fukushige | F42B 12/76 73/12.05 |

OTHER PUBLICATIONS

FR Search Report, dated Oct. 14, 2015, from corresponding FR application.

* cited by examiner

SOLID PROJECTILE WITHOUT STABILIZING STRUCTURE FOR BIRD STRIKE TESTS CONSISTING OF A GEL COMPRISING GLYCEROL

The invention relates to the field of investigating the strength properties of a solid material by application of a mechanical force and more particularly relates to a projectile, comprising a material similar to a gel and able, thanks to its shape and its physical properties, to simulate a bird.

BACKGROUND OF THE INVENTION

In the aeronautics field, an important normative system exists due to the criticality of a potential accident. Each aircraft is forced to meet a set of rules in order to be certified and thus allowed to fly and convey passengers. This regulation can change according to the problems encountered in flight and also the materials used and the manufacturing methods. The justification methods have also changed even if a major part is still performed by tests. The changes have always been performed in order not to deteriorate the passenger safety level.

The certification of an aircraft indicates that the latter meets the navigability regulatory requirements. Its structure must withstand the exceptional loads (static strength) that are encountered, but also the application of repeated loads (endurance). For the requirements, the demonstration of a safe behavior up to the limits of the specified field is required. Other parts of the regulation include requirements related to the bird strike resistance. Thus, the manufacturers have to demonstrate to the certification authorities that each sensitive component of an apparatus, such as the cockpit, the foredeck and the wing leading edge, which may be struck by a bird, withstands such strike or at least such strike does not affect in a catastrophic manner the flight safety and the landing of the aircraft. The authorities also require that the final test be performed with an actual bird. For the sake of reproducibility and uniformity, and for avoiding the use of live or dead birds, artificial birds, also called substitute impactors, have been developed and are used as a substitute for actual birds. The idea of a substitute impactor has been studied since about twenty years but, although the manufacturers are now used to employ it during the phases of designing the parts, none of them have manifested the will to use it for the certification tests. The emergence of dynamic calculation over the past years should give a second life to the substitute impactor, which can be modeled far more easily, and encourage the manufacturers to use it for the development and certification tests, to the extent that it could be validated by the entitled authorities of European and American civil aviation (particularly EASA and FAA).

Some of these impactors are constituted by a mixture of water and gelatin and are in particular used for simulating the suction of birds by a reactor. However, this gelatin-based mixture has to be thick enough to allow to be handled and projected on the target such as a reactor or an aircraft wing. This can be provided by mixing a significant amount of gelatin with hot water, and then letting the mixture stand such that the resulting gel is sufficiently rigid, solid and stable for allowing it to be fired at a speed representative of specific conditions of actual strikes of birds on flying aircrafts.

However, a disadvantage is that the gel tends to have a rubbery consistence, which does not entirely reproduce the actual behavior of a bird. The high level of elasticity can cause the rebound or an unusual crushing of the impactor upon striking while an actual bird would not do it.

Furthermore, the projectiles are fired into the areas of the elements to be tested at a high speed, for example using a gas gun, such as using compressed air. Due to the high speeds and the high air resistance resulting therefrom during the projectile flight phase, the impactor is deformed, which affects the quality of the simulation of an actual bird and the quality of the tests, if only due to the changes made to the trajectory and/or to the speed of the projectile, in particular regarding the measurement of the latter that needs to be acquired.

To prevent these disadvantages, U.S. Pat. No. 8,220,396 describes a projectile comprising a stabilizing structure, for example made of cardboard and with a honeycomb shape, surrounded by gel formed, for example, from water and gelatin or a compound similar to a jelly, such as rubber, silicone, soap glycerin, starch, polymer gel, rubber, latex and/or modelling paste.

This stabilizing structure, on one hand, has a high rigidity for preventing the projectile from deforming during flight and, on the other hand, is very fragile such that it is almost immediately destroyed upon striking the target and thus, according to the author, has almost no influence on the behavior of the projectile upon striking.

Patent application US2010/0077832 describes a projectile comprising a solid foam and a gel. The foam phase is generally a polymer foam such as for example phenolic resin foam, polyurethane foam, polyester sponge foam or urea-formaldehyde resin foam.

This foam can have an open structure to allow the gel, when it separates, to be suctioned, by capillarity, into the pores of the foam, the porosity of the latter being preferably higher than 80%. It is indicated that this foam can simulate the skeleton of a bird.

The gel is preferably an aqueous gel. The gelling agent can be selected from the following list: gelatin, agar, carrageenan, pectin, konnyaku, carob gum, alginates, gellan gum, hypromellose, hydroxypropylmethyl cellulose, xantham gum and starch. Preferably, the gelling agent is gelatin. It can be absorbed entirely or not within the foam.

The projectiles according to these patents have a good capacity to retain their sizes in flight, but add additional elements which make the projectile manufacture more complex and, regardless of the authors, add elements which affect the quality of the tests and especially their similarity to a live bird.

SUMMARY OF THE INVENTION

The aim of the invention is to solve the above-mentioned disadvantages by providing a projectile able to perfectly simulate the strike of a live or dead bird on a structure, easy to manufacture, and having almost no deformation in flight.

The solution provided is a solid projectile without stabilizing structure for bird strike tests consisting of a gel comprising glycerol.

The use of glycerol allows to improve the preservation of the projectile but above all significantly increases the dimensional stability of the projectile in case of high speed flight, typically higher than 150 m/sec.

According to a particular feature, a projectile according to the invention comprises more than 20% of glycerol, and preferably between 30% and 40% of glycerol.

According to a feature, a projectile according to the invention comprises a gelling agent, for example agar, glycerol, microbeads and water. The microbeads preferably have a size lower than 200 μm and can, for example, be made of phenolic resin.

The presence of microbeads enhances the breaking of the projectile upon striking and improves the quality of the simulation of the behavior of an actual bird.

In order to further increase the quality of the simulation of the behavior of an actual bird, a projectile according to the invention comprises:
2% to 8% of a gelling agent, and preferably 5%,
30% to 40% of glycerol, and preferably 35%,
1% to 5% of microbeads, and preferably 3.2%,
at least 47% of water, and preferably 56.8%.

According to another feature, the gelling agent is selected from the following list: gelatin, agar, carrageenan, pectin, konnyaku, carob gum, alginates, gellan gum, hypromellose, hydroxypropylmethyl cellulose, xantham gum and starch.

Such an artificial projectile is highly homogeneous, thereby facilitating its modelling and allowing to create any shape, and it has a behavior that is more reproducible than that of live or dead birds and as close as possible to their average behavior, while being conservative.

According to another feature, a projectile according to the invention has a hemispherical shape on either side of a cylindrical central portion.

According to an additional feature, the central portion has a diameter between 90 mm and 130 mm for a height between 60 mm and 00 mm and, preferably, a central portion with a height of 70.1 mm and a diameter of 95 mm or a central portion with a height of 88.3 mm and a diameter of 119.7 mm.

According to another feature, the projectile has a density between 950 kg/ms and 970 kg/ms.

According to a particular feature, a projectile according to the invention comprises a central portion with a height of 70.1 mm and a diameter of 95 mm for a mass of about 908 grams.

BRIEF DESCRIPTION OF THE DRAWINGS

Other advantages and features will become more apparent upon reading the description of several embodiments of the invention, together with the appended drawings in which:

FIG. 2 shows a table regrouping calculations of:
the average of the correlation coefficients obtained on the various sensors,
the average of the amplitude ratios obtained on the various sensors,
the ratio of the kinetic energies of the chicken and the impactor (AM),
wherein the calculations have been performed from measurements of pressure and of deformation of said plate.

DETAILED DESCRIPTION OF THE PREFERRED EMBODIMENTS

Figure 1:
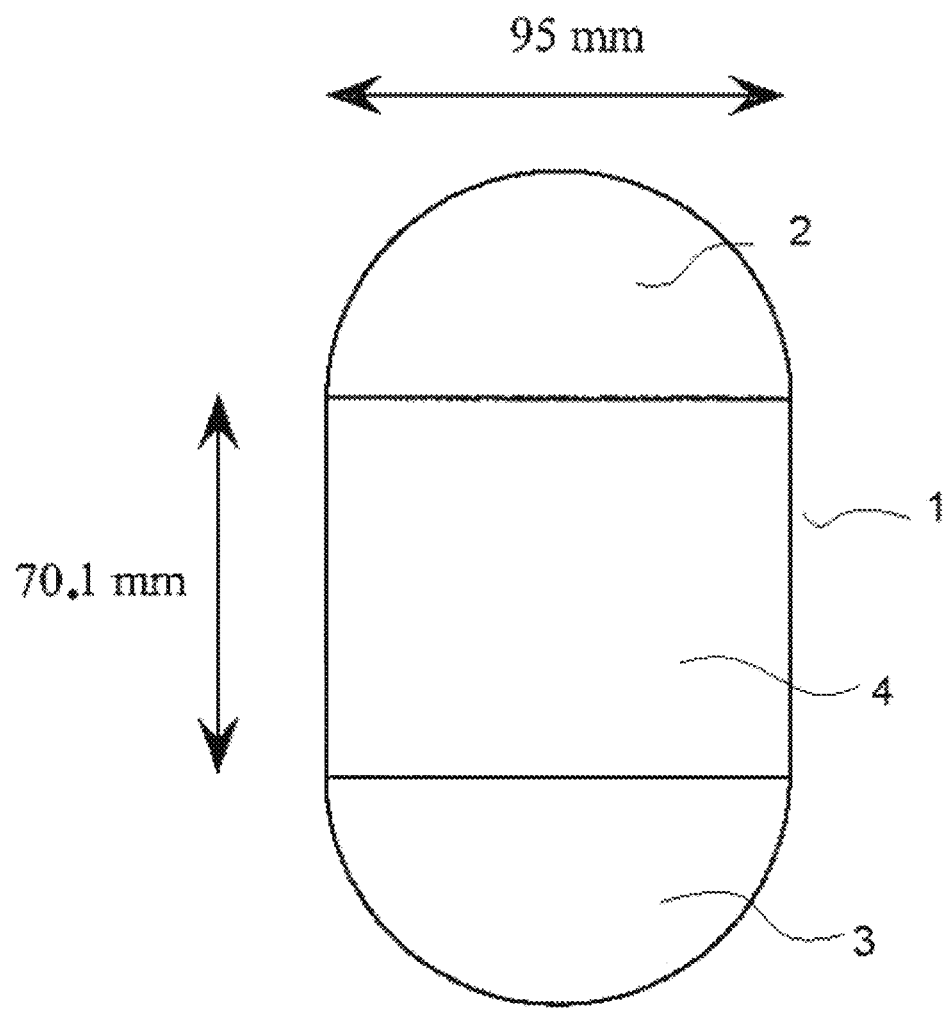
FIG. 1 shows an example for the shape of a solid projectile without stabilizing structure according to the invention.

FIG. 1 shows an example for the shape of a solid projectile 1 without stabilizing structure according to the invention. It has a central portion 4 of cylindrical shape comprising a substantially hemispherical portion 2, 3 at each of its ends. The height of the central portion 4 is about 70.1 mm and its diameter is equal to about 95 mm, thereby having a maximum length of about 165.1 mm for a mass of about 908 g.

This projectile is composed of:
5% of gelling agent, namely agar with high solubility,
35% of glycerol,
3.2% of microbeads,
56.8% of water.

The preparation thereof was as follows 1:
1. Heating water at a temperature between 80° C. and 85° C.,
2. Mixing the gelling agent, namely agar, in the glycerol for obtaining a binding,
3. Mixing the microbeads with the binding,
4. Adding hot water smoothly and under stirring for several minutes, for example 5 minutes,
5. Cooling the resulting mixture to a temperature between 50° C. and 54° C., and then pouring the resulting mixture into a mold having the shape of the projectile,
6. Cooling at ambient temperature.

After complete cooling, the resulting projectile is unmolded and then stored, for example under plastic film, at a temperature preferably between 5° C. and 10° C.

Tests for comparison between the consequences of a chicken strike and that of an impactor (AM) according to the invention have been performed with a test piece constituted by a Kevlar plate on the rear face of which have been arranged pressure sensors FX, FY, FZ and strain gauges.

As shown in Table 1, first tests 2 and 17 were intended to describe the consequences of a strike of a chicken of 925 g and of an impactor according to the invention of 900 g which were thrown against the front face of said plate with an angle of 45° at a speed of 117 m/sec, respectively 123 m/sec, and second tests 2bis and 17bis were intended to describe the consequences of a strike of a chicken of 905 g and of an impactor according to the invention of 900 g which were thrown against the front face of said plate with an angle of 45° at a speed of 165 m/sec, respectively 167 m/sec.

TABLE 1

| Target | Angle | Projectile | Plate No. | Firing No. | Speed (m/sec) | Mass (g) | Energy (J) |
|---|---|---|---|---|---|---|---|
| Kevlar | 45 | Substitute | 678 | 2 | 123 | 900 | 6808 |
| | | Chicken | 679 | 17 | 117 | 925 | 6331 |
| | | Substitute | 678 | 2 bis | 167 | 900 | 12550 |
| | | Chicken | 679 | 17 bis | 165 | 905 | 12319 |

Figure 2:
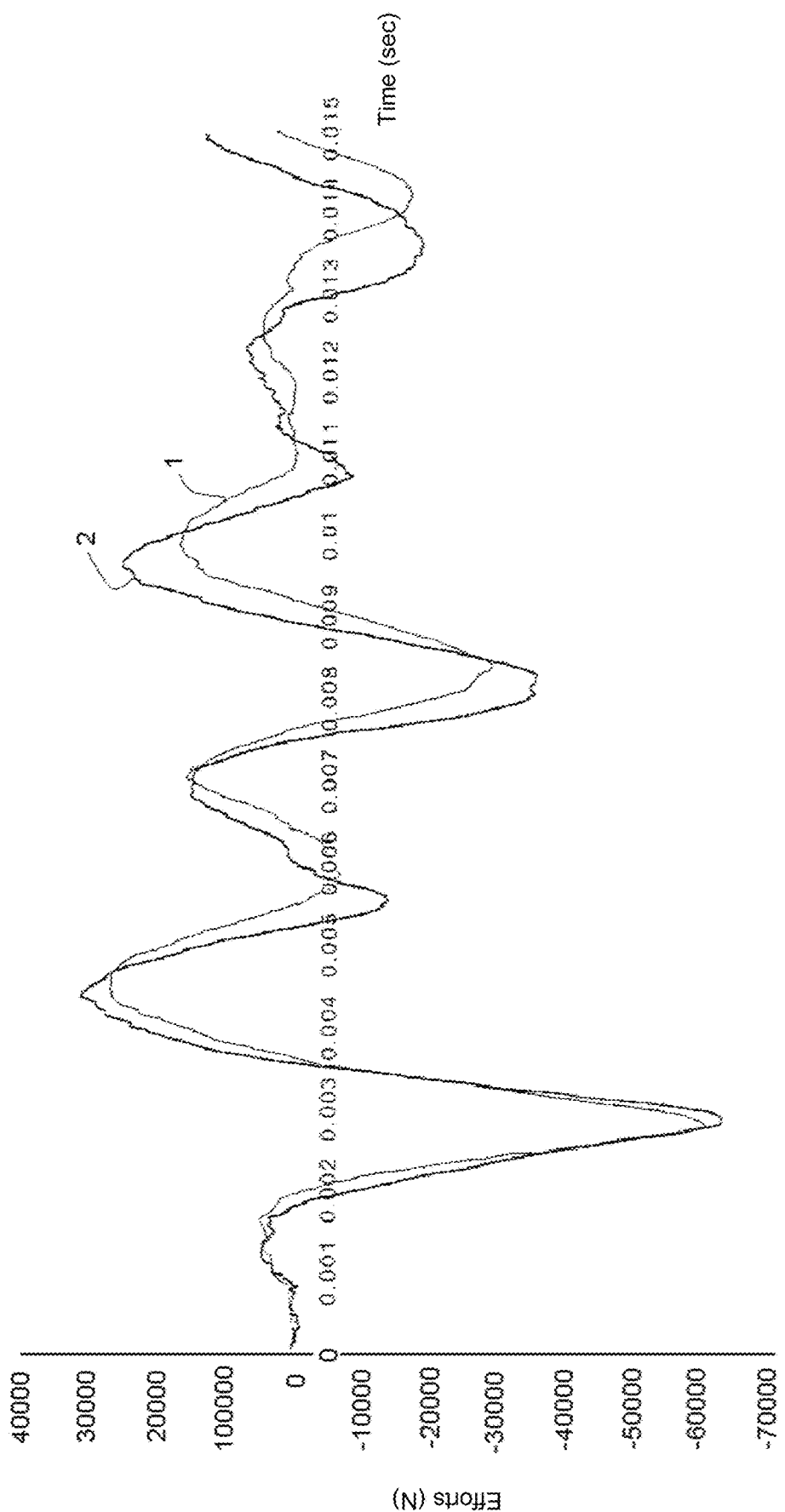
FIG. 2 shows the type of pressures measured on a plate as a function of time, the curve No. 1 being for the chicken and the curve No. 2 being for the impactor (AM) according to the invention.

The pressures applied on said plate, measured as a function of time, are the same type as those shown in FIG. 2, the curve No. 1 being for the chicken and the curve No. 2 being for the impactor (AM) according to the invention. It can be noted that an offset of the pressure peaks increases over time.

Also, the comparison between the general shape of both curves is performed by calculating, as a function of time, the correlation coefficient of both curves between the initial time and time t. This coefficient is between −1 and 1; it is equal to 1 when these curves vary exactly in phase, and is equal to −1 if they are in antiphase. Furthermore, for quantifying the similarity of the importance of the deformations applied, it is necessary to calculate the amplitude ratio, namely the ratio of the efficient values of the signals.

From these results, have been calculated:
the average of the correlation coefficients obtained on the various sensors,
the average of the amplitude ratios obtained on the various sensors,
the ratio of the kinetic energies of the chicken and of the impactor (AM)

Table 2 provides the results of the calculations mentioned above.

TABLE 2

| Test parameters | | | | Average of correlations | | | | Energy Chicken/AM deviation | Average of amplitude ratios | | | |
|---|---|---|---|---|---|---|---|---|---|---|---|---|
| Chicken | AM | Angle | Speed (m/sec) | FX | FY | FZ | Gauges | | FX | FY | FZ | Gauges |
| 17 | 2 | 45° | 120 | 91% | 89% | 96% | 96% | 92% | 84% | 87% | 89% | 96% |
| 17 bis | 2 bis | 45° | 166 | 91% | 94% | 99% | 95% | 98% | 63% | 84% | 100% | 98% |

The values of 95% for the averages of the correlations are very high, thereby indicating that the time profile of the signals related to the chicken and those related to the impactor are close while the amplitude ratio is of the same order as the ratio of the incident energies, which means that, with identical energy, the impactor applies deformations equivalent to those of a chicken.

Figure 3:
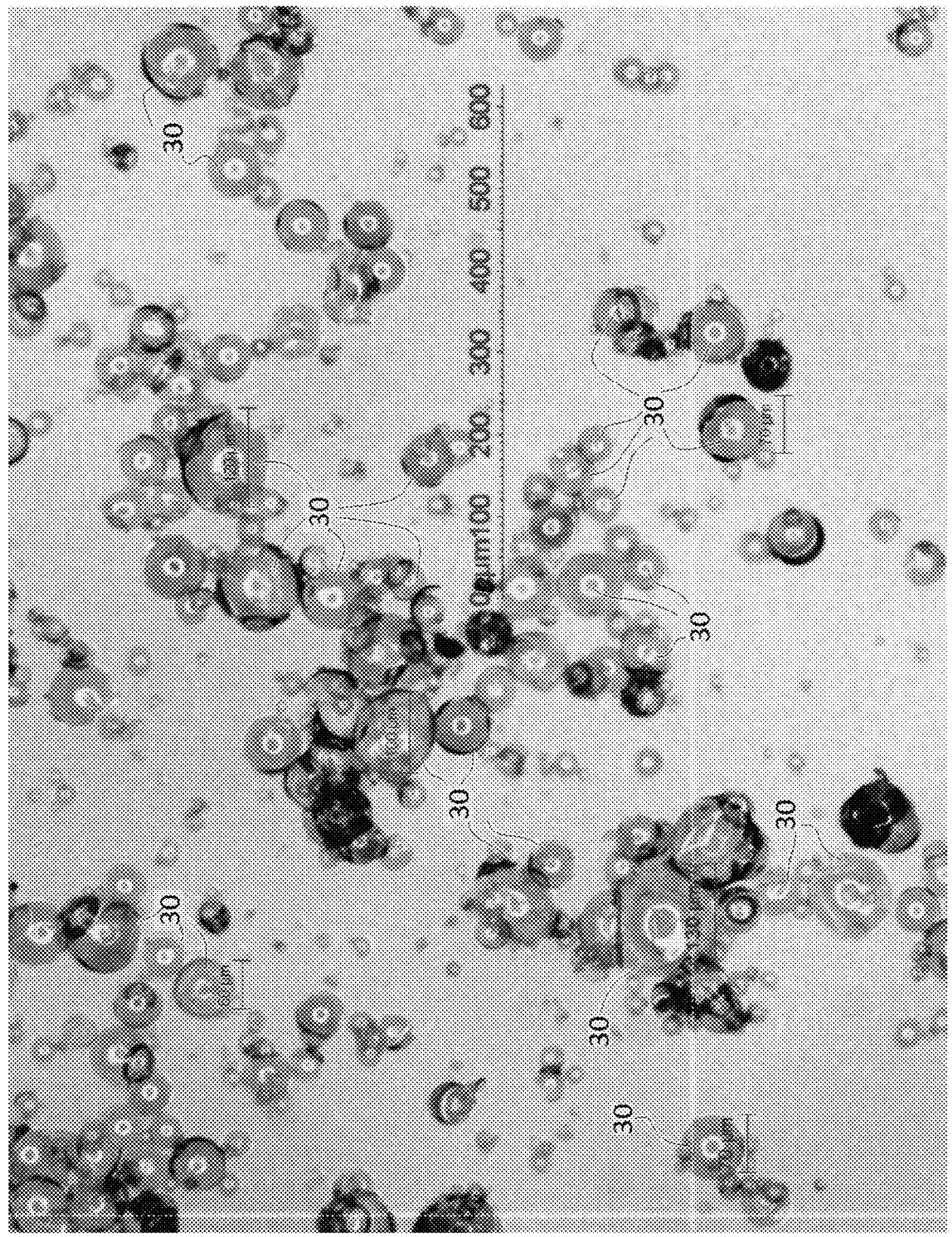
FIG. 3 shows an example of view, under a microscope, of the microbeads within a projectile according to the invention.

FIG. 3 shows an example of view, under a microscope, of the microbeads within a projectile according to the invention. In this example of embodiment, the microbeads are made of phenolic resin and have a diameter lower than 200 μm. On this picture, the size of the present microbeads is between 10 μm and 130 μm.

The invention claimed is:

1. A solid projectile without stabilizing structure for bird strike tests, the projectile comprising between 30% and 40% of glycerol.

2. The projectile according to claim 1, wherein the projectile comprises a gelling agent, glycerol, microbeads and water.

3. The projectile according to claim 2, wherein the microbeads have a size lower than 200 μm.

4. The projectile according to claim 2, wherein the microbeads are made of phenolic resin.

5. The projectile according to claim 2, wherein the gelling agent is selected from the group consisting of: gelatin, agar, carrageenan, pectin, konnyaku, carob gum, alginates, gellan gum, hypromellose, hydroxypropylmethyl cellulose, xantham gum and starch.

6. The projectile according to claim 1, wherein the projectile has a hemispherical shape on either side of a cylindrical central portion.

7. The projectile according to claim 6, wherein the central portion has a diameter between 90 mm and 130 mm for a height between 60 mm and 100 mm.

8. The projectile according to claim 7, wherein the central portion has a height of 70.1 mm and a diameter of 95 mm.

9. The projectile according to claim 7, wherein the central portion has a height of 88.3 mm and a diameter of 119.7 mm.

10. The projectile according to claim 1, wherein the projectile has a density between 950 kg/m$^3$ and 970 kg/m$^3$.

11. A solid projectile without stabilizing structure for bird strike tests, the projectile comprising:
2% to 8% of the gelling agent,
30% to 40% of glycerol,
1% to 5% of microbeads, and
at least 47% of water.

12. The projectile according to claim 11, wherein the projectile comprises 5% of the gelling agent.

13. The projectile according to claim 11, wherein the projectile comprises 35% of glycerol.

14. The projectile according to claim 11, wherein the projectile comprises 3.2% of microbeads.

15. The projectile according to claim 11, wherein the projectile comprises 56.8% of water.

16. A method for manufacturing a solid projectile without stabilizing structure for bird strike tests, where the projectile comprises more than 20% of glycerol, the method comprising:
mixing a gelling agent in the glycerol for providing a binding;
mixing microbeads with the binding;
adding hot water to the microbeads and binding under stirring for several minutes to produce a resulting mixture, the hot water having been previously heated at a temperature between 80° C. and 85° C.; and
pouring the resulting mixture into a mold having a shape of the projectile.

17. The method according to claim 16, wherein the step of pouring the resulting mixture into a mold is performed when the temperature of the mixture is between 50° C. and 54° C.

18. The method according to claim 16, where the projectile comprises between 30% and 40% of glycerol.

* * * * *